United States Patent [19]
Chang

[11] Patent Number: 6,132,042
[45] Date of Patent: Oct. 17, 2000

[54] PLASTIC OPTICAL FRAME HAVING ADJUSTABLE NOSE PAD

[76] Inventor: Chit Ming Chang, N0. 8 Whitefield Road, Ngan Tao Building, floor 15, block A, Hong Kong, China

[21] Appl. No.: 09/364,957

[22] Filed: Jul. 30, 1999

[51] Int. Cl.[7] .................................................. G02C 5/12
[52] U.S. Cl. ........................................... 351/138; 351/136
[58] Field of Search ................................... 351/136, 138, 351/137, 139, 41

[56] References Cited

U.S. PATENT DOCUMENTS 5,872,612  2/1999  MacIntosh, Jr. et al. ............... 351/138

*Primary Examiner*—Hung Xuan Dang
*Attorney, Agent, or Firm*—Joseph M. Jong

[57] ABSTRACT

The invention provides a nose pad assembly for a plastic optical frame comprising a nose pad body, a handle fixedly attached to the nose pad body, the handle having a handle bore extending substantially vertically through the handle, one or more columns extending from the plastic optical frame having one or more column bores, and a fastener extending through the handle bore and the one or more column bores to hingedly fasten the nose pad body to the plastic optical frame.

12 Claims, 1 Drawing Sheet

PLASTIC OPTICAL FRAME HAVING ADJUSTABLE NOSE PAD

BACKGROUND OF THE INVENTION

1. Field of Invention

The present invention generally relates to eyewear frames. More particularly, the present invention relates to a nose pad assembly for plastic optical frames.

2. Background of the Related Art

Traditional plastic optical frames include two pieces of nose pads fixedly attached on the frame for supporting the frames on the nose position. Because the fixed nose pads on the plastic optical frame cannot be adjusted to fit different nose shapes and sizes, traditional plastic optical frames are not properly supported on the nose for many people wearing these plastic optical frames and become uncomfortable to wear for many people.

One attempt to provide adjustable nose pads on plastic optical frames involves using the metal frame nose pad assembly on a plastic frame. However, the metal nose pad assembly can only be adjusted in some cases by twisting the metal pad arms attached between the nose pads and the frame. It is inconvenient to adjust the nose pads in this manner, and the structure of the pad assembly is easily damaged or broken by twisting the metal nose pad arms. Furthermore, it is difficult to securely join metal nose pad arms to a plastic frame.

Therefore, there is a need for a convenient adjustable nose pad assembly for plastic optical frames.

SUMMARY OF THE INVENTION

The invention generally provides an adjustable nose pad assembly for plastic optical frames. The nose pad assembly according to the invention facilitates convenient and easy adjustment to fit the contours of particular noses and provide superior comfort for persons wearing the eyewear frames. Unlike the traditional metal nose pad assemblies, the nose pad assembly according to the invention is not easily damaged by persons adjusting the nose pads.

One aspect of the invention provides a nose pad assembly for a plastic optical frame comprising a nose pad body, a handle fixedly attached to the nose pad body, the handle having a handle bore extending substantially vertically through the handle, one or more columns extending from the plastic optical frame having one or more column bores, and a fastener extending through the handle bore and the one or more column bores to hingedly fasten the nose pad body to the plastic optical frame. Preferably, the nose pad body includes a nose contact surface having an elongated shape, such as an oval or an ellipsoid. The column preferably has a curved inner surface adapted to fit the contours of a human nose.

DESCRIPTION OF THE PREFERRED EMBODIMENT

Figure 1:
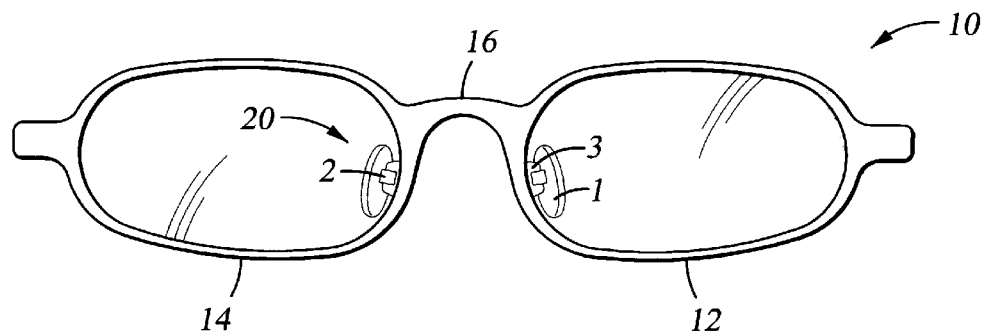
FIG. 1 is a front view of a plastic optical frame having nose pads according to the invention.

FIG. 1 is a front view of a plastic optical frame having nose pads according to the invention. The plastic optical frame 10 includes left and right lens frames 12, 14, connected by a bridge portion 16 therebetween. A nose pad assembly 20 is disposed on an inner portion of each of the lens frames 12, 14, to support the optical frame on the nose of a person wearing the optical frames. The nose pad assembly 20 comprises a nose pad body 1, a handle 2 fixedly attached to the nose pad body 1, and one or more columns 3 extending from the plastic optical frame adapted to provide a hinged connection with the handle 2 of the nose pad body 1.

Figures 2, 3, 4:
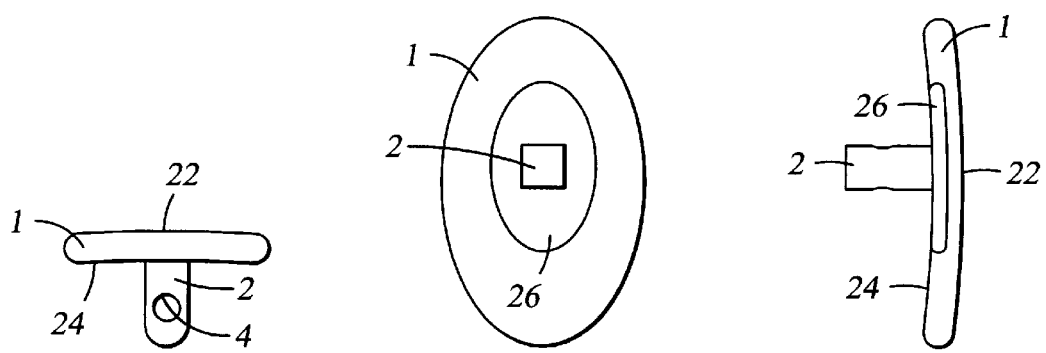
FIG. 2 is a top view of a nose pad according to the invention.
FIG. 3 is a back view of a nose pad according to the invention.
FIG. 4 is a side view of a nose pad according to the invention.

FIGS. 2–4 are top, back and side views, respectively, of a nose pad according to the invention. Referring to FIGS. 2–4, the handle 2 includes a handle bore 4 extending substantially vertically through the handle. The nose pad body 1 preferably includes a curved front surface 22 to provide a comfortable surface to contact the nose. The handle 2 extends from a back surface 24 of the nose pad body 1. The handle 2 is preferably molded with the nose pad body 1 as a single piece molded unit. Alternatively, the handle 2 can be made of metal or other rigid materials and includes a handle base 26 that is glued, bonded or otherwise attached to the back surface 24 of the nose pad body 1.

Figures 5, 6:
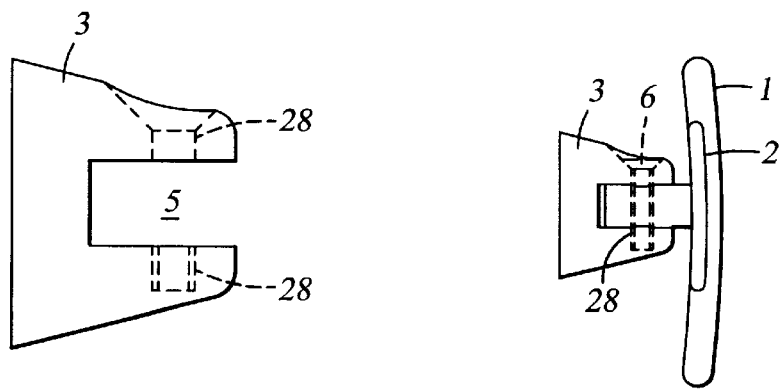
FIG. 5 is side view of a nose pad column according to the invention.
FIG. 6 is a schematic view of a nose pad secured onto a nose pad column according to the invention.

FIG. 5 is side view of a nose pad column according to the invention. FIG. 6 is a schematic view of a nose pad body secured onto a nose pad column according to the invention. Referring to FIGS. 1, 5 and 6, the nose pad column 3 extends from an inner vertical portion of the lens frame. Preferably, the inner surface of the nose pad column 3 is curved to adapt to fit the contours of the nose to provide additional comfort to the wearer. The nose pad column 3 includes one or more column bores 28 extending vertically through the nose pad column 3. The nose pad column 3 also preferably includes a gap 5 adapted to receive the handle 2 of the nose pad body 1 such that the column bores 28 are vertically aligned with the handle bore 4. A fastener 6, such as a screw or a bolt, extends through the handle bore 4 and the one or more column bores 28 to hingedly fasten the nose pad body 1 to the plastic optical frame 10. Preferably, the nose pad body 1 is fastened to the plastic optical frame 10 to allow rotation with respect to the vertical axis through the fastener 6. The fastener 6 can also be tightened to securely hold the position of the nose pad body 1 in a desired position as set by a person wearing the particular frames.

While foregoing is directed to the preferred embodiment of the present invention, other and further embodiments of the invention may be devised without departing from the basis scope thereof, and the scope thereof is determined by the claims that follow.

What is claimed is:

1. A nose pad assembly for a plastic optical frame, comprising:

a nose pad body;

a handle fixedly attached to the nose pad body, the handle having a handle bore extending substantially vertically through the handle;

at least one column extending from the plastic optical frame having at least one column bore; and a fastener extending through the handle bore and the at least one column bore to hingedly fasten the nose pad body to the plastic optical frame.

2. The nose pad assembly of claim 1 wherein the nose pad body includes a nose contact surface having an elongated shape.

3. The nose pad assembly of claim 2 wherein the nose contact surface has an oval shape.

4. The nose pad assembly of claim 2 wherein the nose contact surface has an ellipsoid shape.

5. The nose pad assembly of claim 1 wherein each column has a curved inner surface adapted to fit a contour of a human nose.

6. The nose pad assembly of claim 1 wherein the fastener provides adjustable movement of the nose pad body relative to the plastic optical frame.

7. A plastic optical frame having a nose pad assembly, comprising:
   a nose pad body;
   a handle fixedly attached to the nose pad body, the handle having a handle bore extending substantially vertically through the handle;
   at least one column extending from the plastic optical frame having at least one column bore; and
   a fastener extending through the handle bore and the at least one column bore to hingedly fasten the nose pad body to the plastic optical frame.

8. The plastic optical frame of claim 7 wherein the nose pad body includes a nose contact surface having an elongated shape.

9. The plastic optical frame of claim 7 wherein the nose contact surface has an oval shape.

10. The plastic optical frame of claim 7 wherein the nose contact surface has an ellipsoid shape.

11. The plastic optical frame of claim 7 wherein each column has a curved inner surface adapted to fit a contour of a human nose.

12. The plastic optical frame of claim 7 wherein the fastener provides adjustable movement of the nose pad body relative to the plastic optical frame.

\* \* \* \* \*